(12) United States Patent
Ohkawa

(10) Patent No.: US 8,107,772 B2
(45) Date of Patent: Jan. 31, 2012

(54) IMAGE PROCESSING APPARATUS, IMAGE READING APPARATUS, IMAGE PROCESSING METHOD, AND RECORDING MEDIUM

(75) Inventor: Mieko Ohkawa, Tokyo (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1203 days.

(21) Appl. No.: 11/839,320

(22) Filed: Aug. 15, 2007

(65) Prior Publication Data

US 2008/0063309 A1   Mar. 13, 2008

(30) Foreign Application Priority Data

Sep. 7, 2006   (JP) .................................. 2006-242649

(51) Int. Cl.
*G06K 9/00* (2006.01)
*G06K 9/18* (2006.01)
*G06K 9/46* (2006.01)
*G06K 9/32* (2006.01)
*G06K 9/36* (2006.01)
*H04N 1/40* (2006.01)
*G09G 5/02* (2006.01)

(52) U.S. Cl. ........ 382/299; 382/181; 382/190; 382/192; 382/237; 358/3.01; 358/3.05; 345/589

(58) Field of Classification Search .................. 382/299, 382/181, 190, 192; 358/3.01–3.05
See application file for complete search history.

(56) References Cited

U.S. PATENT DOCUMENTS

| 6,011,878 | A | * | 1/2000 | Ushida et al. | 382/298 |
| 6,154,568 | A | * | 11/2000 | Chen et al. | 382/232 |
| 6,160,913 | A | * | 12/2000 | Lee et al. | 382/176 |
| 6,203,133 | B1 | * | 3/2001 | Tanaka et al. | 347/15 |
| 7,164,502 | B2 | * | 1/2007 | Nose et al. | 358/3.03 |

FOREIGN PATENT DOCUMENTS

| JP | 10-191038 A | 7/1998 |
| JP | 2002-135572 | 5/2002 |
| JP | 2002-185785 A | 6/2002 |

OTHER PUBLICATIONS

Notification of Reason for Refusal in JP 2006-242649 dated Nov. 11, 2008, and an English Translation thereof.

\* cited by examiner

*Primary Examiner* — Brian Q Le
*Assistant Examiner* — Jose M Torres
(74) *Attorney, Agent, or Firm* — Buchanan Ingersoll & Rooney PC

(57) ABSTRACT

Disclosed is an image processing apparatus including a tone converting section to convert a tone level of a target pixel in multi-level image data based on a threshold value of the tone level so that the number of tone levels is reduced; a resolution converting section to output a pixel block according to the tone level, to generate image data with higher resolution; and an error diffusing section to diffuse an error; and wherein when the converted tone level is a predetermined value or lower, the resolution converting section refers to an output sequence category of a black pixel in a pixel block of a surrounding pixel, selects an output sequence pattern belonging to an output sequence category which allows a black pixel in a pixel block of the target pixel and the surrounding pixel to be concentrated, and outputs a pixel block corresponding to the selected pattern.

18 Claims, 9 Drawing Sheets

FIG.2
30
|   |   | a |   |   |   |   |
|---|---|---|---|---|---|---|
|   |   | A | B | C | D | E |
| b | A | D | D | A | B | D |
|   | B | A | A | A | B | A |
|   | C | D | D | A | B | D |
|   | D | C | C | A | C | C |
|   | E | D | D | A | B | D |
FIG.3
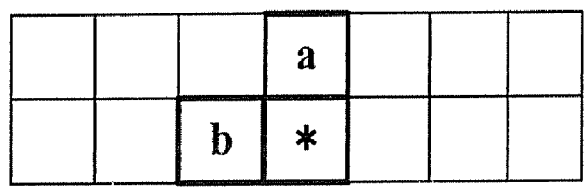
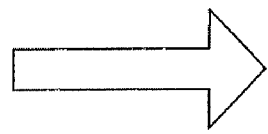
a,b : REFERENCE PIXEL
\* : TARGET PIXEL

FIG. 4

| OUTPUT SEQUENCE CATEGORY \ OUTPUT SEQUENCE PATTERN | ▨□ / ▨▨ | □▨ / ▨▨ | ▨▨ / □▨ | ▨▨ / ▨□ |
|---|---|---|---|---|
| A | [0 1 / 2 3]  [0 2 / 1 3] | | | [0 3 / 1 2]  [0 3 / 2 1] |
| B | [1 0 / 2 3]  [2 0 / 1 3] | [2 0 / 3 1]  [1 0 / 3 2] | | [1 3 / 0 2]  [2 3 / 1 0] |
| C | [1 2 / 0 3]  [2 1 / 0 3] | [3 0 / 2 1]  [3 1 / 0 2] | [1 0 / 3 2]  [1 1 / 3 2] | |
| D | | [3 1 / 2 0]  [3 2 / 1 0] | [2 1 / 3 0]  [1 2 / 3 0] | [2 3 / 0 1]  [1 3 / 2 0] |
| E | | | [3 3 / 3 3] | |

40

COEFFICIENT PATTERN 1

COEFFICIENT PATTERN 2

COEFFICIENT PATTERN 3

COEFFICIENT PATTERN 4

COEFFICIENT PATTERN 5

\* : TARGET PIXEL

IMAGE PROCESSING APPARATUS, IMAGE READING APPARATUS, IMAGE PROCESSING METHOD, AND RECORDING MEDIUM

BACKGROUND

1. Field of the Invention

This invention is related to an image processing apparatus, an image reading apparatus, an image processing method, and a recording medium.

2. Description of Related Art

Techniques to convert low resolution multi-level image data to high resolution image data using a pixel block comprising a predetermined number of pixels have been proposed. Multi-level represents the number of tone levels larger than those an output pixel block can reproduce.

For example, when low resolution multi-level image data is converted to high resolution two-level image data, a tone conversion value is generated according to a dither threshold matrix, and tone conversion data is converted using the tone conversion value. In this regard, a method of image processing which rapidly generates high resolution two-level image data having granularity and resolution by referring to a pixel concentrated type dither threshold matrix was proposed (For example, Japanese Patent Laid-Open Publication No. 2002-185785). This method, by concentrating black pixels in the converted image data, prevents isolated black pixels from not reproduced in printing, thus enhances dot reproducibility in printing.

However, according to the above method, since the dither threshold matrix is used and a concentrating processing of black pixels is performed throughout the whole image data, a certain pattern is produced and texture noise easily occurs.

SUMMARY

It is one of main objects to provide a technique to enhance dot reproducibility and image quality of converted image data when multi-level image data is converted to high resolution image data.

An image processing apparatus reflecting one aspect of the present invention comprises: a tone converting section to convert a tone level of a target pixel in multi-level image data based on a threshold value of the tone level so that the number of tone levels is reduced; a resolution converting section to output a pixel block consisting of the predetermined number of pixels according to the tone level obtained in the tone converting section with respect to each target pixel, so as to generate image data with higher resolution than the multi-level image data; and an error diffusing section to diffuse an error between the tone levels before and after the tone conversion in the tone converting section to a surrounding pixel of the target pixel, based on a diffusion coefficient pattern, and wherein when the converted tone level of the target pixel is a first predetermined value or lower, the resolution converting section refers to an output sequence category of a black pixel used in a pixel block of a surrounding pixel of the target pixel, selects an output sequence pattern of a black pixel belonging to an output sequence category which allows a black pixel in a pixel block of the target pixel and a black pixel in a pixel block of the surrounding pixel to be concentrated, and outputs a pixel block corresponding to the selected output sequence pattern.

It is desirable that the above-described image processing apparatus, further comprises a first memory section to store a plurality of output sequence patterns, wherein the resolution converting section selects the output sequence pattern of the target pixel from the plurality of output sequence patterns stored in the first memory section.

It is desirable that in the above-described image processing apparatus, the first memory section stores the output sequence patterns in association with output sequence categories.

It is desirable that in the above-described image processing apparatus, the first memory section stores the plurality of output sequence patterns, which include an output sequence pattern of all pixels being white.

It is desirable that the above-described image processing apparatus, further comprises a second memory section to store pixel concentration information indicating an output sequence category of the target pixel in association with an output sequence category of the surrounding pixel of the target pixel, the output sequence category of the target pixel allows a firstly output black pixel of the target pixel to be concentrated to a firstly output black pixel of the surrounding pixel, wherein, the resolution converting section determines the output sequence category of the target pixel based on the pixel concentration information stored in the second memory section and the output sequence category of the surrounding pixel of the target pixel, and selects the output sequence pattern of the target pixel from an output sequence pattern belonging to the determined output sequence category.

It is desirable that in the above-described image processing apparatus, the resolution converting section selects randomly or by a user's instruction the output sequence pattern of the target pixel from the output sequence patterns belonging to the output sequence category of the target pixel which is determined based on the pixel concentration information.

It is desirable that in the above-described image processing apparatus, when the converted tone level is a second predetermined value or higher, the resolution converting section selects randomly or by a user's instruction the output sequence pattern of the target pixel from the plurality of output sequence patterns stored in the first memory section.

It is desirable that in the above-described image processing apparatus, when there is an isolated black pixel in the pixel block of the target pixel to be output, among the threshold values of the tone converting section, the resolution converting section changes a threshold value for a conversion to a tone level indicating a white pixel to a threshold value for a conversion to the tone level indicating that the pixel block has at least one black pixel.

It is desirable that the above-described image processing apparatus, further comprises a third memory section, wherein the resolution converting section stores in the third memory section the output sequence category of the target pixel whose pixel block is output, to refer to the output sequence category stored in the third memory section as an output sequence category of a surrounding pixel.

It is desirable that the above-described image processing apparatus, further comprises a first operating section to receive an input of setting of a threshold value of the tone converting section, wherein the tone converting section converts the tone level of the target pixel in the multi-level image data based on the threshold value set by the input through the first operating section.

It is desirable that in the above-described image processing apparatus, further comprises a second operating section to receive an input of setting of a diffusion coefficient pattern of the error diffusing section, wherein the error diffusing section performs diffusion processing of the error of the target pixel to the surrounding pixels based on the error diffusion pattern set by the input through the second operating section.

BRIEF DESCRIPTION OF THE DRAWINGS

These and other objects, advantages and features of the present invention will become more fully understood from the detailed description given hereinbelow and the appended drawings, and thus are not intended to define the limits of the present invention, and wherein;

FIG. 2 is a diagram showing components of a pixel concentration LUT 30;

FIG. 3 is a diagram showing a relation of positions between reference pixels a and b and a target pixel;

FIG. 4 is a diagram showing components of an output sequence pattern table;

DETAILED DESCRIPTION OF PREFERRED EMBODIMENTS

Below, an embodiment of the present invention will be described in detail with reference to the drawings. However, the scope of the present invention is not limited to the examples illustrated.

Figure 1:
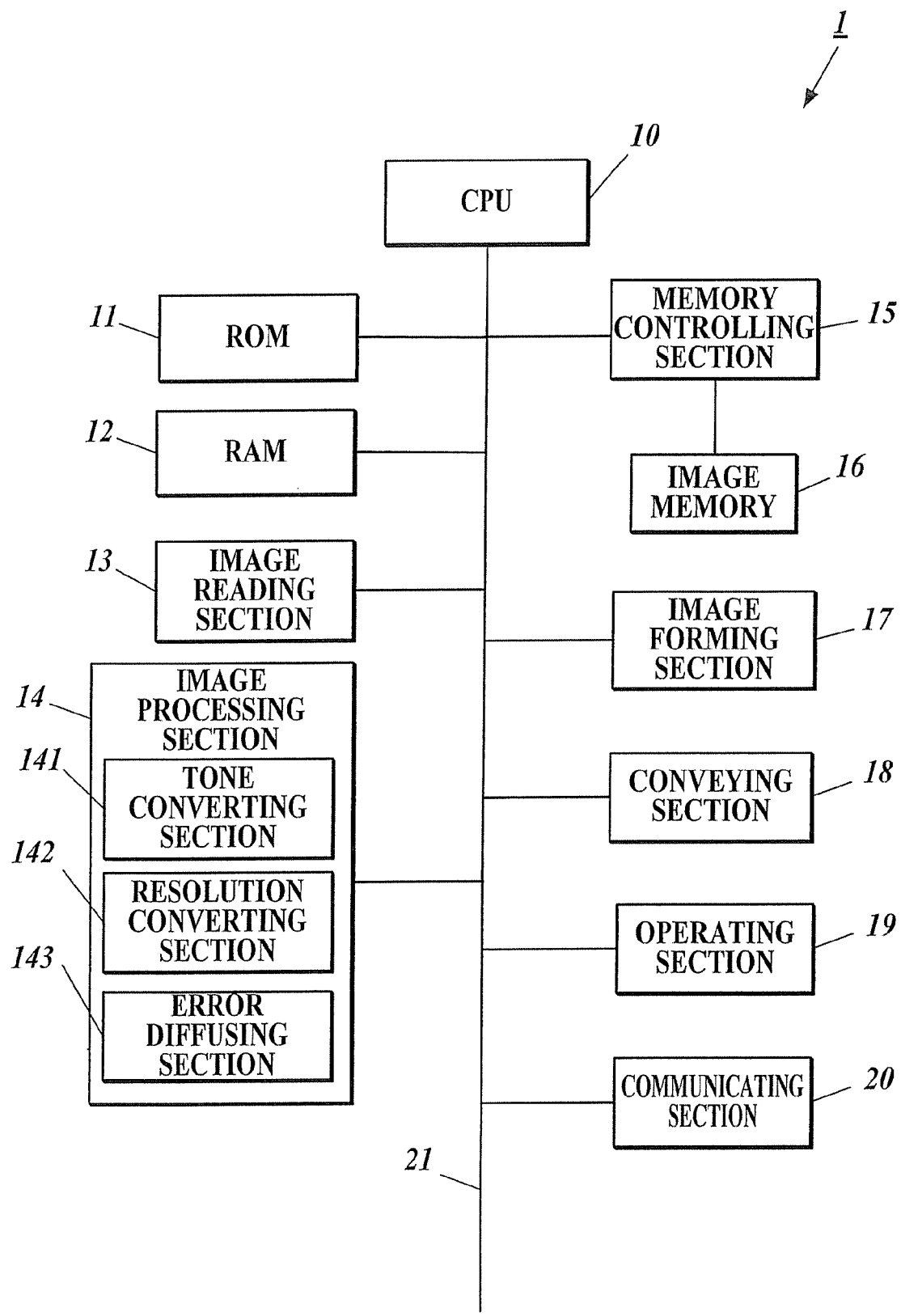
FIG. 1 is a block diagram showing an internal configuration of an image forming apparatus 1 of an embodiment of the present invention.

A configuration of an embodiment of the present invention is described with reference to FIG. 1. FIG. 1 shows an internal configuration of an image forming apparatus 1.

As shown in FIG. 1, the image forming apparatus 1 comprises a CPU (Central Processing Unit) 10, a ROM (Read Only Memory) 11 as a first and second memory section, a RAM (Random Access Memory) 12, an image reading section 13, an image processing section 14, a memory controlling section 15, an image memory 16, an image forming section 17, a conveying section 18, an operating section 19 as a first and second operating section, and a communicating section 20, and the sections are connected to each other by a bus 21.

The CPU 10 centrally controls the sections of the image forming apparatus 1. The CPU 10 develops in the RAM 12 designated programs among various system programs and application programs stored in the ROM 11, and these developed programs and the CPU 10 operate together to perform various processing.

Based on a later-described image conversion program, CPU 10 allows the tone converting section 141 to convert tones of a target pixel of a multi-level image data input from the image reading section 13, etc. Also, based on the program, when a converted tone level of the target pixel is 1 or 2, the CPU 10 allows the resolution converting section 142 to convert the resolution to a high resolution pixel block so that the black pixels of the pixel blocks of the target pixel and the surrounding pixels are concentrated. Further, based on the program, the CPU 10 allows the error diffusing section 143 to diffuse error between the tone levels of before and after the tone conversion of the target pixel to surrounding pixels with respect to all of the target pixels and obtains high resolution two-level image data.

The ROM 11 stores various programs executed by the CPU 10 to enable various functions of operations of the image forming apparatus 1 and stores various data used when such programs are executed. Specifically, the ROM 11 stores an image conversion program, threshold data used in tone conversion processing by the image processing section 14, pixel concentration LUT (Look Up Table) 30 (See FIG. 2), output sequence pattern table 40 (See FIG. 4), and diffusion coefficient pattern data used in error diffusion processing (See FIG. 5).

The RAM 12 develops various control programs executed by the CPU 10 to a program storage area and temporarily stores data of processing results, etc., in the work area which are generated when various control programs are executed.

The image reading section 13 comprises a scanner, etc. and reads image information of an original document with the scanner to generate image data. Specifically, the image reading section 13 scans an original document which is placed on a transparent contact glass by using illumination from a light source, forms an image with the reflected light using a CCD (Charge Coupled Device), makes an optoelectronic conversion, and generates multi-level image data to output to the image processing section 14.

The image processing section 14 performs various image processing such as scaling processing, filter processing, gamma conversion processing, to the input multi-level image data. The image processing section 14 comprises a tone converting section 141, a resolution converting section 142, and an error diffusing section 143, and performs tone conversion with comparison to the threshold value, resolution conversion to convert to high resolution image data, and error diffusion processing, respectively, to the image data to be processed. The processing in the tone converting section 141, the resolution converting section 142, and the error diffusing section 143 will be described in detail below.

The tone converting section 141 converts the tone level of the target pixel of the input (low resolution) multi-level image data (hereinafter (low resolution) multi-level image data will be referred to as multi-level image data) from the image reading section 13. Specifically, the tone converting section 141 reads out threshold value data stored in the ROM 11, retains threshold values THR_0 to THR_3 selected by a user in a threshold value register (not shown) in the image processing section 14, and converts the tone level of the target pixel with comparison to the threshold values THR_0 to THR_3 retained in the threshold value register. In this embodiment, four values which are THR_0 to THR_3 are used as threshold values, however the values are not limited to this number. The conversion may be performed using the tone conversion LUT stored in the ROM 11, instead of the threshold values.

The resolution converting section 142 outputs a pixel block which can reproduce the same tone level as the tone level obtained in the tone conversion in the tone converting section 141 to generate image data with higher resolution than the input image data after tone conversion. Specifically, the resolution converting section 142 reads out the data of the pixel concentration LUT 30 and the output sequence pattern 40 stored in the ROM 11, retains the data in the resolution conversion register (not shown) in the image processing section 14, selects an output sequence pattern of the target pixel based on the pixel concentration LUT 30 and the output sequence pattern 40 and outputs a pixel block corresponding to the output sequence pattern. The resolution converting section 142 retains the output sequence category of the target pixel of the output pixel block in the buffer memory (not shown) which functions as a third memory section in the image processing section 14 to use in the next selection of the output sequence pattern of the target pixel. Whether or not to generate high resolution image data may be selected by operating the operating section 19 and when a selection is made to generate the high resolution image data, processing by the resolution converting section 142 may be performed.

The error diffusing section 143 performs error diffusion processing in which an error of the tone level of the target pixel of before and after the tone conversion performed in the tone converting section 141 is retained in the buffer memory (not shown) of the image processing section 14, then the error is diffused to the unprocessed surrounding pixels of the multi-level image data, and the error is added to the tone levels of the surrounding pixels. Specifically, the error diffusing section 143 reads out the diffusion coefficient pattern data stored in the ROM 11, retains the data in the coefficient pattern register (not shown) in the image processing section 14 so that a user can make a selection. Then, the diffusion coefficient pattern selected by the user is retained in the coefficient pattern register and the error diffusing section 143 multiplies coefficients shown in the selected diffusion coefficient pattern to the error of the target pixel retained in the buffer memory, and adds the multiplied values to the original tone level of the surrounding pixels.

The tone converting section 141, the resolution section 142, and the error diffusing section 143 may be a software type configuration in which each section employs a CPU, a RAM, etc., and the CPU and the programs developed to the RAM operate together to enable various processing, or may be a hardware type configuration with circuits, etc.

The memory controlling section 15 controls access to the image memory 16 when reading out and writing in the image data. The image memory 16 comprises a volatile or non-volatile recording medium and stores the image data processed in the image processing section 14.

The image forming section 17 forms an image on transfer paper with a predetermined printing method (for example, electrophotography, ink-jet method, thermal transfer method, etc.) in accordance with printing control signals by the CPU 10. The conveying section 18 conveys the transfer paper before and after the image forming using a plurality of rollers.

The operating section 19 comprises various function keys such as numeric keys and a start key, and a touch panel integrated with a display screen such as an LCD (Liquid Crystal Display), and outputs to the CPU 10 operation signals corresponding to the key operation and operation signals corresponding to the input operation on the touch panel.

The communicating section 20 comprises an NIC (Network Interface Card), etc., and mediates transmission and reception of information such as image data with external apparatuses such as a PC (Personal Computer), a print server, etc.

Next, various data stored in the ROM 11 will be explained with reference to FIG. 2 to FIG. 5.

The ROM 11 stores threshold values (for example, four or more values) used in the tone conversion of the target pixel of the multi-level image data. Threshold values THR_0 to THR_3 are selected by a user operation from the threshold values read out from the ROM 11 and the values are stored in the threshold value register in the image processing section 14. These values are the initial values of the threshold values THR_0 to THR_3.

In this embodiment, the multi-level image data is converted to a high resolution two-level image data and more specifically one pixel of the multi-level image data is converted to 2×2=4 pixels (pixel block). The number of tones of the output tone level can be obtained by the following equation (1).

Number of tones of the output tone level={(number of tones of the high resolution image data−1)×number of pixel blocks}+1 (1)

The number of tones in the high resolution image data=2, the number of pixel blocks=4, thus the number of tones of the output tone level is 5.

As for the threshold values THR_0 to THR_3, a value suitable for discriminating a condition below of the number of tones=5 is set.

tone level of the target pixel<THR_0→tone level=0 (0/8 bit)

THR_0≦tone level of the target pixel<THR_1→tone level=1 (64/8 bit)

THR_1≦tone level of the target pixel<THR_2→tone level=2 (128/8 bit)

THR_2≦tone level of the target pixel<THR_3→tone level=3 (192/8 bit)

THR_3≦tone level of the target pixel→tone level=4 (255/8 bit)

FIG. 2 shows the components of the pixel concentration LUT 30. FIG. 3 shows a relation of a position between reference pixels a and b and the target pixel. The ROM 11 stores the pixel concentration LUT 30 shown in FIG. 2. The pixel concentration LUT 30 is a table which includes reference pixels a and b of the multi-level image data and output sequence categories A to E of the target pixel corresponding to the output sequence categories A to E of the reference pixels a and b. As shown in FIG. 3, the surrounding pixels above and on the left of the target pixel * of the multi-level image data, are to be the location of the reference pixels a and b, respectively.

When the target pixel is in the uppermost line or on the left edge, there is a case where there are no pixels in the area of the reference pixels a and b, thus in such a case, the output sequence category of such locations is to be a predetermined output sequence category (for example, output sequence category E). The output sequence categories of the target pixels are temporarily stored in the buffer memory of the image processing section 14, and the output sequence categories are later used as output sequence categories of the reference pixels. Thus, the buffer memory is arranged so that output sequence categories of at least two lines of multi-level image data can be stored.

FIG. 4 shows components of the output sequence pattern table 40. The ROM 11 stores the output sequence pattern table 40 shown in FIG. 4. The output sequence pattern table 40 includes a plurality of output sequence patterns corresponding to the pixels 2×2. In the output sequence patterns shown in FIG. 4, the numbers (0 to 3) shown in each pixel of each pixel output sequence pattern shows the output sequence of the black pixels when the image data after the tone conversion is converted to four high resolution pixels with respect to each pixel, and the black pixels are preferentially output in the sequence of these numbers. The output sequence categories A to D are categories classified by the position of the black pixel which is output first in the output sequence pattern.

In the output sequence pattern table 40, the output sequence patterns are classified based on the output sequence categories A to E. In FIG. 4, the output sequence pattern table 40 is also classified as an output sequence pattern in which up to the third pixel is a black pixel. This classification is to enable the output sequence pattern table 40 to be seen easily. The output sequence pattern of the output sequence category E is an output sequence pattern in which all of the pixels are white and since the output sequence has no meaning, the pattern is represented with an optional same number "3".

The pixel concentration LUT 30 and the output sequence pattern table 40 read out from the ROM 11 are stored in the resolution conversion register of the image processing section 14 and used.

Figure 5:
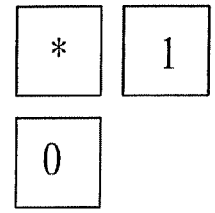
FIG. 5 is a diagram showing diffusion coefficient patterns.
Figure 5:
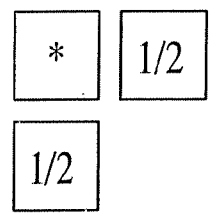
Figure 5:
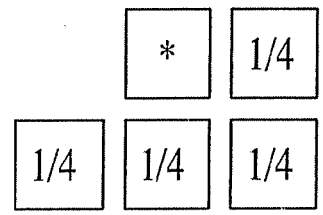
Figure 5:
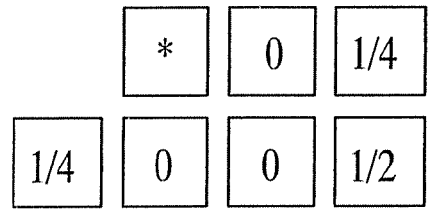
Figure 5:
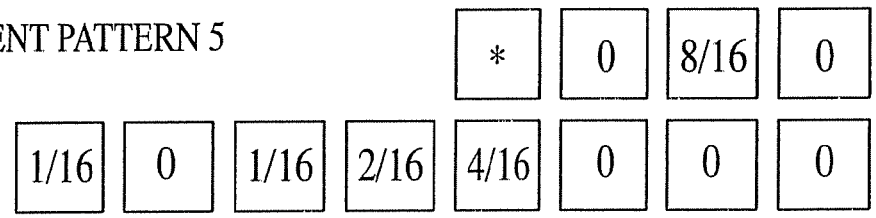

FIG. 5 shows the diffusion coefficient patterns. In the ROM 11, data of a plurality of different diffusion coefficient patterns (coefficient patterns 1 to 5) as shown in FIG. 5 are stored. The diffusion coefficient patterns are used for error diffusion processing performed on the multi-level image data. Based on one of these coefficient patterns 1 to 5, the error between the tone levels of before and after the tone conversion of the target pixel * is multiplied to the diffusion coefficients of the surrounding pixels and added to the tone levels of the surrounding pixels.

The data of the coefficient patterns read out from the ROM 11 is stored in the coefficient pattern register in the image processing section 14 to be used, and the data of the coefficient patterns in the coefficient pattern register selection can be set with an operation by a user.

Figure 6A:
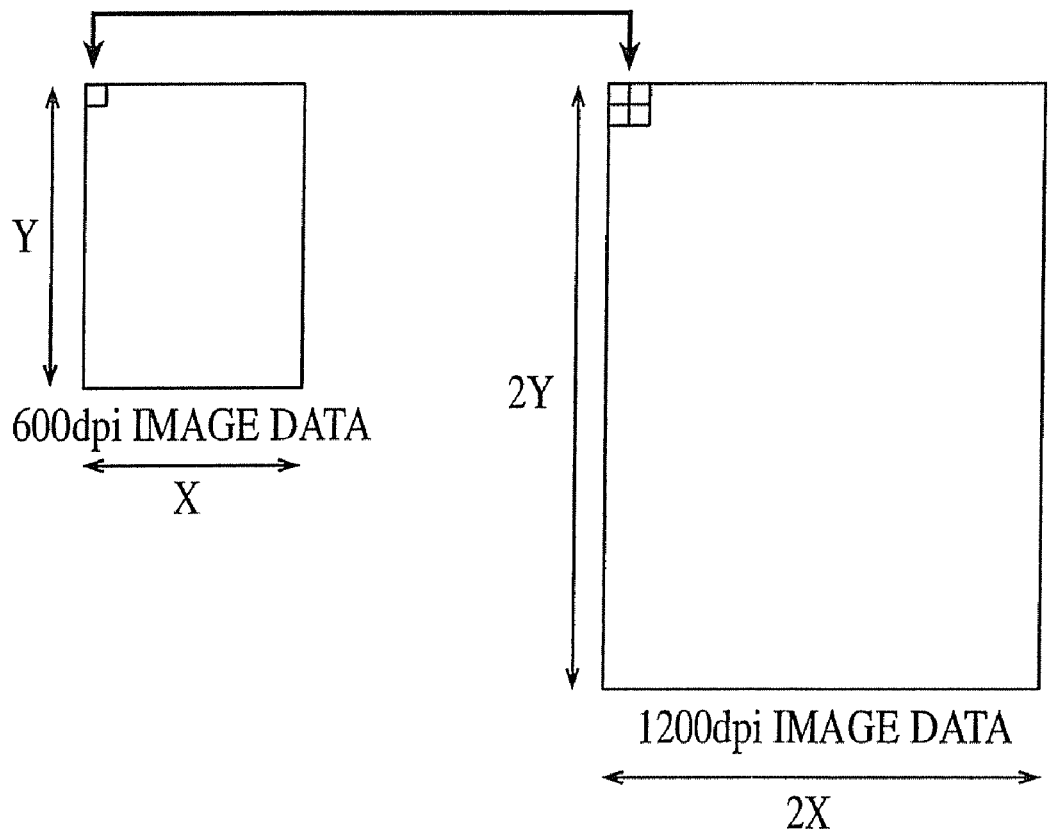
FIG. 6A is a diagram showing an image of converting 600 dpi image data to 1200 dpi image data.
Figure 6B:
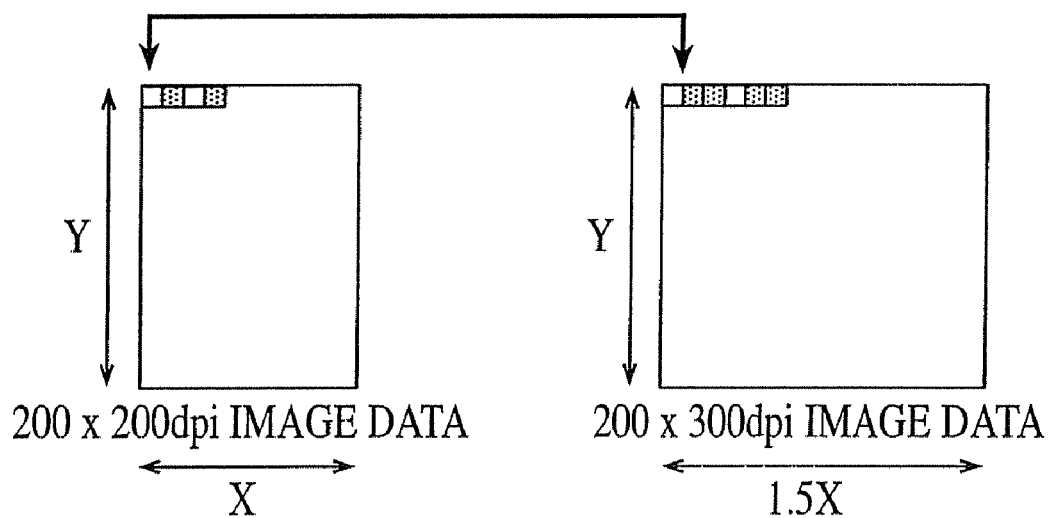
FIG. 6B is a diagram showing an image of converting 200×200 dpi image data to 200×300 dpi image data.

Next, an operation of this embodiment will be described with reference to FIG. 6A to FIG. 9. First, an outline of an image conversion of this embodiment will be described with reference to FIG. 6A to FIG. 8. FIG. 6A shows an image of converting 600 dpi image data to 1200 dpi image data. FIG. 6B shows an image of converting 200×200 dpi image data to 200×300 dpi image data.

Image processing in which multi-level image data is converted to high resolution image data with a small number of tones will be considered. One pixel of input multi-level image data is converted to a pixel block comprising n×m pixels (integer of n≧1, m≧1) to generate high resolution image data. The pixel block is determined by a size of the original input data and the high resolution image data to be generated. For example, when generating a 1200 dpi image data from a 600 dpi image data, as shown in FIG. 6A, the 1200 dpi image data can be generated by converting one pixel of the 600 dpi image data is converted to a four pixel block, the length×width being 2×2.

In a case such as converting 200×200 dpi image data to 200×300 dpi image data in which a conversion to an integral multiple pixel is not possible, as shown in FIG. 6B, 200×300 dpi image data can be generated by alternately converting one pixel of the 200×200 dpi image data to a one pixel block, the length×width being 1×1, and a two pixel block, the length×width being 1×2. In this embodiment, generating 1200 dpi image data from 600 dpi image data as shown in FIG. 6 will be described, however the resolution is not limited to this number.

Figure 7:
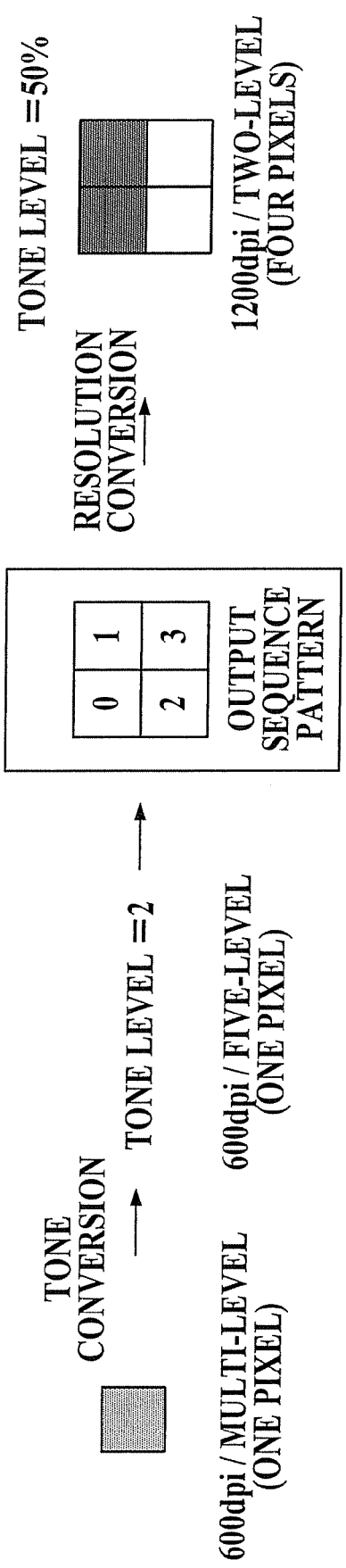
FIG. 7 is a diagram showing a conversion from a multi-level pixel to a pixel block with two-level pixels.

An outline of an alteration of the pixel of the image conversion processing of this embodiment when the target pixel is one pixel is described with reference to FIG. 7. FIG. 7 shows a conversion from a multi-level pixel to a pixel block with two-level pixels.

As shown in FIG. 7, first, one pixel of the 600 dpi multi-level image data is selected as the target pixel, and the multi-level tone level of the target pixel is converted to a five-level tone level (=0 to 4) with the tone conversion processing. Then, an output sequence pattern corresponding to the target pixel is selected, and based on the output sequence pattern, a four pixel block which reproduces the same tone level as the converted tone level is output.

Figure 8:
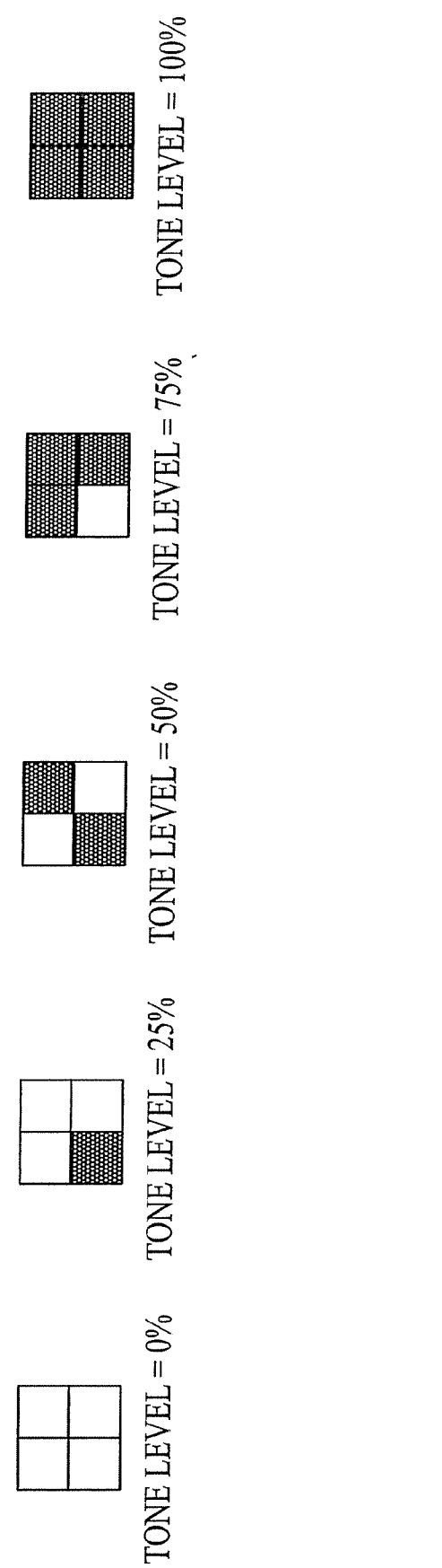
FIG. 8 is a diagram showing a pixel block with four two-level pixels with different tone levels.

FIG. 8 shows a two-level four pixel block with different tone levels. As shown in FIG. 8, the four pixel block has five patterns of tone levels which are 0, 25, 50, 75, or 100% in which the number of black pixels are 0, 1, 2, 3, or 4. In other words, the tone levels 0, 1, 2, 3, and 4 of the target pixel after the tone conversion correspond to the tone levels 0, 25, 50, 75, and 100%, respectively. In the example shown in FIG. 7, the tone level of the target pixel is set to 2 in the tone conversion, and based on the selected output sequence pattern, conversion to a four pixel block with a tone level of 50% is performed in which the upper two pixels are black pixels.

Figure 9:
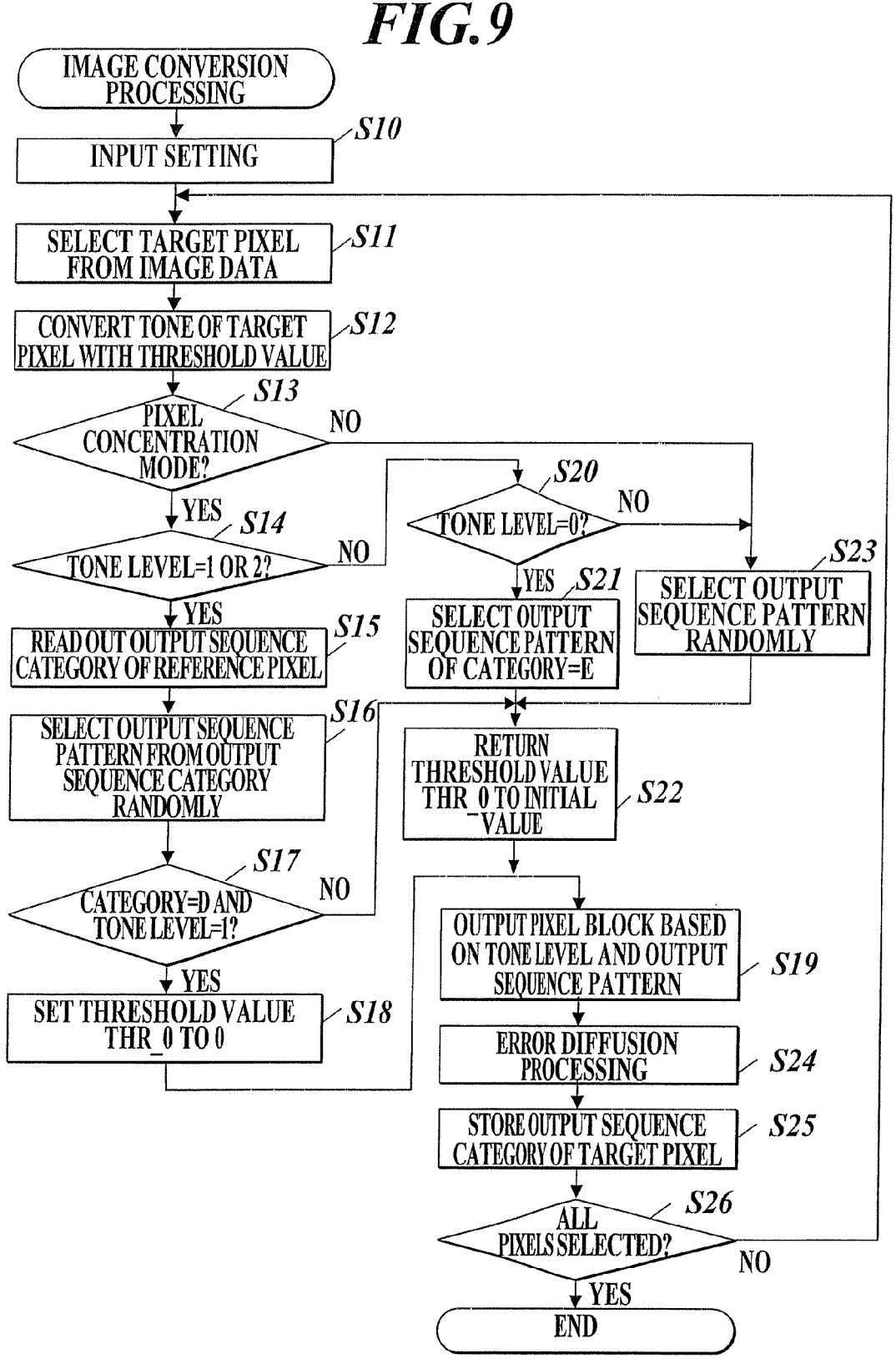
FIG. 9 is a flow chart showing an image conversion processing.

Next, an image conversion processing performed in the image forming apparatus 1 will be described with reference to FIG. 9. FIG. 9 shows a flow chart of the image conversion processing. Image conversion processing is processing in which multi-level image data input from the image reading section 13 or the communicating section 20 is converted to high resolution two-level image data.

In the image forming apparatus 1, for example, an instruction to perform the image conversion processing from a user through the operating section 19 functions as a trigger and an image conversion program read out from the ROM 11 and developed to the RAM 12 operates together with the CPU 10 to perform the image conversion processing.

An original document is read by the image reading section 13 or image data is received through the communicating section 20 from an external device beforehand and the image data is stored in advance in the image memory 16 as multi-level image data which is to be the object of image conversion.

As shown in FIG. 9, first, threshold values of the tone conversion and the data of error diffusion coefficient patterns 1 to 5 are read out from the ROM 11, and through the operating section 19, selection input of threshold values THR_0 to THR_3, selection input of a coefficient pattern, and setting input of whether or not to set to a pixel concentration mode is received and set (step S10). The pixel concentration mode is a mode in which the black pixels are concentrated when the image data is converted to a high resolution. The threshold values THR_0 to THR_3 and the coefficient pattern do not have to be selected from data stored in the ROM 13, and may be newly input in step S10. The threshold values THR_0 to THR_3 set in step S10 are stored in the threshold value register of the image processing section 14, and the coefficient pattern set in step S10 is stored in the coefficient pattern register of the image processing section 14.

The tone converting section 141 reads out the multi-level image data from the image memory 16, and one of the pixels among the pixels of the multi-level data which have not been selected is selected as a target pixel and read out (step S11). As a target pixel, first, the upper left end pixel of the multi-level image data is selected, and then the pixels are selected in order from the pixel on the left end of the same line to the pixel on the right end. After all of the pixels on the same line are selected, the processing advances to the line one below. This selection processing is repeated until in the end the lower right end pixel is selected.

The tone converting section 141 converts the tone of the tone level of the target pixel which is being selected based on the threshold value THR_0 to THR_3 in the threshold register set in step S10, and obtains tone level 0 to 4 (step S12). The tone converting section 141 or the error diffusing section 143 stores the error between the tone levels before and after the tone conversion of the target pixel being selected in the buffer memory of the image processing section 14.

The resolution converting section 142 determines whether the mode is in the pixel concentration mode, based on the result of the setting in step S10 (step S13). When the mode is in the pixel concentration mode (step S13; YES), the resolution converting section 142 determines whether the tone level of the target pixel obtained in step S13 is 1 or 2 (step S14).

When the tone level is 1 or 2 (step S14; YES), the resolution converting section 142 reads out from the buffer memory of the image processing section 14 the output sequence category corresponding to the reference pixels a and b of the surrounding pixels stored in the later-described step S25 (step S15). The resolution converting section 142 refers to the pixel concentration LUT 30 stored in the ROM 11 and based on the output sequence category corresponding to the reference pixels a and b obtained in step S15, obtains the output sequence category of the target pixel. The resolution converting section 142 refers to the output sequence pattern chart 40 stored in the ROM 11 and randomly selects an output sequence pattern among the output sequence patterns which belong to the output sequence category corresponding to the obtained target pixel (step S16).

The resolution converting section 142 determines whether the target pixel being selected is output sequence category=D and tone level=1 (step S17). In other words, the resolution converting section 142 determines whether or not only the lower right pixel of the pixel block is a black pixel (whether the black pixel is isolated).

When the output sequence category=D and the tone level=1 (step S17; YES) the threshold value THR_0 stored in the RAM 12 is set to 0 (step S18). The resolution converting section 142 outputs pixel blocks with four pixels according to the tone level and the output sequence pattern of the target pixel being selected (step S19).

When the tone level is not 1 or 2, (step S14; NO), the resolution converting section 142 determines whether or not the target pixel being selected is tone level=0 (step S20). When the tone level=0 (step S20; YES), the resolution converting section 142 refers to the output sequence pattern chart 40 stored in the ROM 11 and an output sequence pattern which belongs to the output sequence category E is selected (step S21). The resolution converting section 142 sets the threshold value THR_0 stored in the threshold value register back to the initial value (step S18), and the processing advances to step S19. When the threshold value THR_0 stored in the threshold value register is the initial value before performing step S21, the threshold value THR_0 is not changed. When the target pixel being selected is not output sequence category=D and tone level=1 (step S17; NO), the processing advances to step S22.

When the mode is not in the pixel concentration mode (step S13; NO), the mode is in a normal conversion mode which converts data to a high resolution image data. In this mode, the resolution converting section 142 refers to the output sequence pattern chart 40 stored in the ROM 11 and an output sequence pattern is randomly chosen from among the output sequence patterns other than those of the output sequence category E (step S23) to advance to step S22. When the target pixel being selected is not tone level=0 (step S20; NO), the process advances to step S23.

After performing step S19, the error diffusing section 143 performs the error diffusion processing in which the error between the tone levels of before and after the tone conversion of the target pixel in step S12 stored in the buffer memory of the image processing section 14 is diffused to the surrounding pixels of the target pixel (step S24). The data of the error diffusion pattern is selected with an input by a user operation, or the pattern may be selected automatically (for example, randomly).

The resolution converting section 142 stores the output sequence category of the target pixel being selected in the buffer memory of the image processing section 14 (step S25). The buffer memory stores output sequence categories of at least two lines of pixels of the multi-level image data. In step S15, the output sequence categories of the pixels already chosen as reference pixels a and b may be erased from the buffer memory to reduce memory space. The resolution converting section 142 determines whether all of the pixels of the multilevel image data have been chosen as the target pixel (step S26). When all of the pixels have not been chosen (step S26; NO), the process goes back to step S11. When all of the pixels have been chosen (step S26; YES), the image conversion processing ends.

According to an embodiment of the present invention, when converting multi-level image data read by the image reading section 13 or received through the communicating section 20, to high resolution two-level image data, the black pixel in the pixel block of the target pixel and the black pixels in the pixel blocks of the surrounding pixels are concentrated in the low concentrated areas in which the converted tone levels=1 or 2, thus the dot reproducibility of the converted image data can be enhanced and the texture noise can be prevented to enhance the image quality.

The ROM 11 stores the output sequence pattern chart 40, thus the output sequence pattern of the target pixel may be chosen from a plurality of output sequence patterns of the output sequence pattern chart 40. By using a plurality of output sequence patterns, the texture noise of the converted image data can be further prevented.

In the output sequence pattern chart 40, the output sequence patterns are associated with the output sequence pattern categories A to E, thus the output sequence patterns belonging to the output sequence pattern categories A to E can easily be read out and the processing of concentrating the black pixel in the pixel block of the target pixel and the black pixels in the pixel blocks of the surrounding pixels can be simplified.

The output sequence pattern chart 40 includes the output sequence pattern category E which corresponds to an output sequence pattern in which all pixels are white pixels, thus the output sequence category E can be used to have knowledge of the surrounding pixels in which all of the pixels are white.

The ROM 11 stores the pixel concentration LUT 30, thus by using the pixel concentration LUT 30, the processing of concentrating the black pixels of the pixel block of the target pixel and the black pixels of the pixel blocks of the surrounding pixels can be simplified.

In the target pixel in which the converted tone level=1 or 2, the output sequence pattern of the target pixel is randomly selected from a plurality of output sequence patterns of the output sequence pattern chart 40 which corresponds to the output sequence categories A to E of the reference pixels a and b, thus the output sequence pattern of the target pixel can be suitably chosen from a plurality of output sequence patterns and the texture noise of the converted image data can be further prevented.

In the target pixels in which the converted tone level=3 or 4, the output sequence pattern of the target pixel is randomly selected from a plurality of output sequence patterns of the output sequence pattern chart 40, thus the dot reproduction of the highly concentrated areas of the converted image data and the image quality can be enhanced.

When the converted tone level of the target pixel=1 and the output sequence category is D, the threshold THR_0 is set to 0, thus in the pixel block of the next target pixel selected, at least one black pixel is included and isolation of the black pixel in the converted image data can be easily prevented.

The output sequence categories of the target pixels which have output pixel blocks are stored in the buffer memory of the image processing section 14, thus the location of the black pixels in the pixel blocks of the surrounding pixels can be easily recognized based on the output sequence categories stored in the buffer memory.

The threshold values THR_0 to THR_3 of the tone conversion is set by input by the user through the operating section 19, thus the threshold values THR_0 to THR_3 of the tone conversion can be easily set and the image quality of the converted image data can be adjusted.

The coefficient patterns 1 to 5 of the error diffusion is selected and set by input from a user through the operating section 19, thus the error diffusion method based on the diffusion coefficient patterns can be set freely.

The descriptions of the above embodiment shows an example of a suitable image processing apparatus, an image reading apparatus, an image processing method and an image processing program, and thus are not intended to limit the present invention. The detailed configuration and the detailed operation comprising the confidential printing system of the embodiment may be modified without departing from the scope of the invention.

For example, in the above-described embodiment, in step S16 and step S23 of the image conversion processing, one output sequence pattern is to be selected randomly from the object of selection of the output sequence patterns, however it is not limited to this configuration. For example, the user may input through the operating section 19 and set the output sequence pattern, etc., which is the object of selection so that the output sequence pattern is selected based on the setting.

Figure 10A:
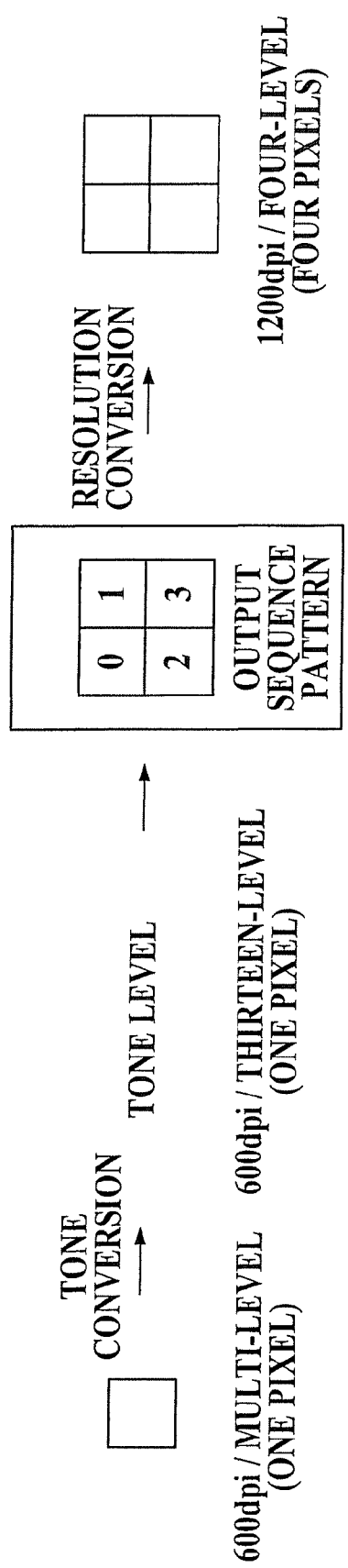
FIG. 10A is a diagram showing a conversion from a multi-level pixel to a pixel block with four-level pixels.
Figure 10B:
FIG. 10B is a diagram showing that a tone of a pixel in an earlier output sequence is set black, before the tone of the next pixel is determined.
Figure 10C:
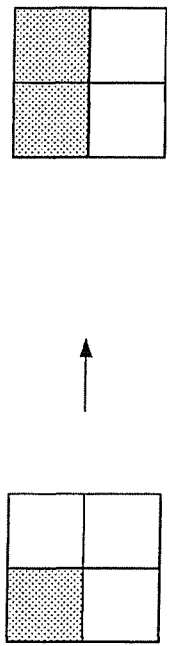
FIG. 10C is a diagram showing a tone of a pixel in an earlier output sequence maintains a state of intermediate tone while the tone of the next pixel is determined.

In the above-described embodiment, the pixels in the output pixel blocks are described to be two-level, but the value is not limited to this number and may be three-level or more. FIG. 10A shows a conversion from a pixel block with multi-level pixels to four-level pixels. As shown in FIG. 10A for example, a pixel of multi-level (8 bit) 600 dpi image data with may be a target pixel, the tone of the target pixel may be converted to thirteen-level with the threshold value, by using the output sequence pattern the conversion can be made to a 1200 dpi pixel block with four pixels and can represent thirteen tones in which each pixel is four-level (3 bit). The tone of the output sequence may be determined by allowing the tone of the pixel of which the output sequence is earlier to be black then determining the tone of the next pixel, as shown in FIG. 10B, or determining the tone of the next pixel while the pixel of which the output sequence is earlier has a tone maintaining a state of intermediate tone as shown in FIG. 10C.

The present U.S. Patent Application claims priority under the Paris Convention of Japanese Patent Application No. 2006-242649 filed on Sep. 7, 2006 to the Japanese Patent Office, which shall be a basis for correcting mistranslations.

What is claimed is:

1. An image processing apparatus comprising:
   a tone converting section, in a computer processor, to convert a tone level of a target pixel in multi-level image data based on a threshold value of the tone level so that the number of tone levels is reduced;
   a resolution converting section, in a computer processor, to output a pixel block consisting of a predetermined number of pixels according to the tone level obtained in the tone converting section with respect to each target pixel, so as to generate image data with higher resolution than the multi-level image data; and
   an error diffusing section, in a computer processor, to diffuse an error between the tone levels before and after the tone conversion in the tone converting section to a surrounding pixel of the target pixel, based on a diffusion coefficient pattern; and
   wherein when the converted tone level of the target pixel is a first predetermined value or lower, the resolution converting section refers to an output sequence category of a black pixel used in a pixel block of a surrounding pixel above and on the left of the target pixel, selects an output sequence pattern of a black pixel belonging to an output sequence category in which a black pixel in a pixel block of the target pixel and a black pixel in a pixel block of the surrounding pixel are adjacent so as to concentrate a black pixel in a pixel block of the target pixel and a black pixel in a pixel block of the surrounding pixel, and outputs a pixel block corresponding to the selected output sequence pattern.

2. The image processing apparatus of claim 1, further comprising a first memory section to store a plurality of output sequence patterns, wherein the resolution converting section selects the output sequence pattern of the target pixel from the plurality of output sequence patterns stored in the first memory section.

3. The image processing apparatus of claim 2, wherein the first memory section stores the output sequence patterns in association with output sequence categories.

4. The image processing apparatus of claim 3, wherein the first memory section stores the plurality of output sequence patterns, which include an output sequence pattern of all pixels being white.

5. The image processing apparatus of claim 2, wherein when the converted tone level is a second predetermined value or higher, the resolution converting section selects randomly or by a user's instruction the output sequence pattern of the target pixel from the plurality of output sequence patterns stored in the first memory section.

6. The image processing apparatus of claim 1, further comprising a second memory section to store pixel concentration information indicating an output sequence category of the target pixel in association with an output sequence category of the surrounding pixel above and on the left of the target pixel, the output sequence category of the target pixel allows a firstly output black pixel of the target pixel to be concentrated to a firstly output black pixel of the surrounding pixel,
   wherein, the resolution converting section determines the output sequence category of the target pixel based on the pixel concentration information stored in the second memory section and the output sequence category of the surrounding pixel of the target pixel, and selects the output sequence pattern of the target pixel from an output sequence pattern belonging to the determined output sequence category.

7. The image processing apparatus of claim 6, wherein the resolution converting section selects randomly or by a user's instruction the output sequence pattern of the target pixel from the output sequence patterns belonging to the output sequence category of the target pixel which is determined based on the pixel concentration information.

8. The image processing apparatus of claim 1, wherein when there is an isolated black pixel in the pixel block of the target pixel to be output, among the threshold values of the tone converting section, the resolution converting section changes a threshold value for a conversion to a tone level indicating a white pixel to a threshold value for a conversion to the tone level indicating that the pixel block has at least one black pixel.

9. The image processing apparatus of claim 1, further comprising a third memory section, wherein the resolution converting section stores in the third memory section the output sequence category of the target pixel whose pixel block is output, to refer to the output sequence category stored in the third memory section as an output sequence category of a surrounding pixel.

10. The image processing apparatus of claim 1, further comprising a first operating section to receive an input of setting of a threshold value of the tone converting section, wherein the tone converting section converts the tone level of the target pixel in the multi-level image data based on the threshold value set by the input through the first operating section.

11. The image processing apparatus of claim 1, further comprising a second operating section to receive an input of setting of a diffusion coefficient pattern of the error diffusing section, wherein the error diffusing section performs diffusion processing of the error of the target pixel to the surrounding pixels based on the error diffusion pattern set by the input through the second operating section.

12. An image reading apparatus comprising:
the image processing apparatus of claim 1; and
an image reading section to read an original document to obtain image data,
wherein the tone converting section converts a tone level of a target pixel in multi-level image data obtained by the image reading section.

13. An image processing method comprising:
converting a tone level of a target pixel in multi-level image data based on a threshold value of the tone level so that the number of tone levels is reduced;
outputting a pixel block consisting of a predetermined number of pixels according to the converted tone level with respect to each target pixel, so as to generate image data with a higher resolution than the multi-level image data; and
diffusing an error between the tone levels before and after the tone conversion in the step of converting the tone level to a surrounding pixel of the target pixel, based on a diffusion coefficient pattern, and
wherein when the converted tone level of the target pixel is a first predetermined value or lower, the step of outputting the pixel block comprises:
referring to an output sequence category of a black pixel used in a pixel block of a surrounding pixel above and on the left of the target pixel;
selecting an output sequence pattern of a black pixel belonging to an output sequence category in which a black pixel in a pixel block of the target pixel and a black pixel in a pixel block of the surrounding pixel are adjacent so as to concentrate a black pixel in a pixel block of the target pixel and a black pixel in a pixel block of the surrounding pixel; and
outputting a pixel block corresponding to the selected output sequence pattern.

14. The image processing method of claim 13, wherein in the step of outputting the pixel block, the output sequence pattern of the target pixel is selected from a plurality of output sequence patterns stored in a first memory section.

15. The image processing method of claim 13, wherein the step of outputting the pixel block comprises:
determining the output sequence category of the target pixel based on the output sequence category of the surrounding pixel above and on the left of the target pixel and pixel concentration information stored in a second memory section, the pixel concentration information indicating an output sequence category of the target pixel which allows a firstly output black pixel of the target pixel to be concentrated to a firstly output black pixel of the surrounding pixel, in association with an output sequence category of the surrounding pixel of the target pixel; and
selecting the output sequence pattern of the target pixel from an output sequence pattern belonging to the determined output sequence category.

16. The image processing method of claim 13, wherein in the step of outputting the pixel block, when there is an isolated black pixel in the pixel block of the target pixel to be output, among the threshold values of the tone converting section, a threshold value for a conversion to a tone level indicating a white pixel is changed to a threshold value for a conversion to the tone level indicating that the pixel block has at least one black pixel.

17. The image processing method of claim 13, wherein in the step of outputting the pixel block, the output sequence category of the target pixel whose pixel block is output is stored in a third memory section, and the output sequence category stored in the third memory section is referred to as an output sequence category of a surrounding pixel.

18. A non-transitory computer-readable medium embodying a program which allows a computer to perform the following processing comprising:
converting a tone level of a target pixel in multi-level image data based on a threshold value of the tone level so that the number of tone levels is reduced;
outputting a pixel block consisting of a predetermined number of pixels according to the converted tone level with respect to each target pixel, so as to generate image data with a higher resolution than the multi-level image data; and
diffusing error between the tone levels before and after tone conversion in the step of converting the tone level to a surrounding pixel of the target pixel, based on a diffusion coefficient pattern, and
wherein when the converted tone level of the target pixel is a first predetermined value or lower, the step of outputting the pixel block comprises:
referring to an output sequence category of a black pixel used in a pixel block of a surrounding pixel above and on the left of the target pixel;
selecting an output sequence pattern of a black pixel belonging to an output sequence category in which a black pixel in a pixel block of the target pixel and a black pixel in a pixel block of the surrounding pixel are adjacent so as to concentrate a black pixel in a pixel block of the target pixel and a black pixel in a pixel block of the surrounding pixel; and
outputting a pixel block corresponding to the selected output sequence pattern.

* * * * *